United States Patent [19]
Nostwick et al.

[11] Patent Number: 5,614,810
[45] Date of Patent: Mar. 25, 1997

[54] POWER FACTOR CORRECTION CIRCUIT

[75] Inventors: Allan A. Nostwick, Huntington; Bryce L. Hesterman, Fort Wayne, both of Ind.

[73] Assignee: MagneTeck, Inc., Los Angeles, Calif.

[21] Appl. No.: 194,916

[22] Filed: Feb. 14, 1994

[51] Int. Cl.⁶ .................................................. G05F 1/70
[52] U.S. Cl. ........................................ 323/207; 323/300
[58] Field of Search ................................. 323/205, 206, 323/207, 208, 209, 210, 211, 222, 282, 284, 286, 300; 363/95

[56]  References Cited

U.S. PATENT DOCUMENTS

| | | | |
|---|---|---|---|
| 3,913,002 | 10/1975 | Steigerwald et al. | 321/2 |
| 4,437,146 | 3/1984 | Carpenter | 363/21 |
| 4,683,529 | 7/1987 | Bucher, II | 363/44 |
| 4,688,162 | 8/1987 | Mutoh et al. | 363/80 |
| 4,816,982 | 3/1989 | Severinsky | 363/44 |
| 4,924,372 | 5/1990 | Fox et al. | 363/89 |
| 5,001,620 | 3/1991 | Smith | 363/89 |
| 5,019,952 | 5/1991 | Smolenski et al. | 363/16 |
| 5,180,964 | 1/1993 | Ewing | 323/222 |
| 5,349,284 | 9/1994 | Whittle | 323/207 |
| 5,359,274 | 10/1994 | Bandel | 323/207 |
| 5,359,276 | 10/1994 | Mammano | 323/207 |

OTHER PUBLICATIONS

Siemens—Application Note TDA 4814, Mar. 1986, pp. 103–107, Michael Herfurth.

*Primary Examiner*—Matthew V. Nguyen
*Assistant Examiner*—Shawn Riley
*Attorney, Agent, or Firm*—Faegre & Benson

[57] ABSTRACT

A compensation circuit in a boost-type preregulator of the type having a power factor control circuit operating in a critical conduction mode by providing a triangular modulation of current according to a sine wave envelope, the compensation circuit in the form of a charge pump circuit acting as a frequency-to-voltage converter and including a capacitor, diode and resistor network providing AC coupled current pulses from the output to the input of the power factor control circuit to reduce crossover distortion during the zero-crossing of input current drawn from a sine wave power source. A capacitor at the current envelope input of the power factor control circuit operates to time-average integrate the current pulses to provide a load-current-dependent bias or compensation signal to the power factor correction circuit regulating the critical conduction mode of operation. In another embodiment, the compensation circuit includes an amplifier connected to a current feedback resistor and to a fixed reference to provide the compensation signal.

27 Claims, 6 Drawing Sheets

POWER FACTOR CORRECTION CIRCUIT

BACKGROUND OF THE INVENTION

In the past it has been known to use switching type preregulators to provide DC power, for example, to electronic ballast circuits for fluorescent lamps. Such preregulators include, but are not limited to a boost-type topology, and have also been known to use input power factor control circuits which have become so popular and in such demand that such power factor control circuits have been reduced to integrated circuit form. One such integrated circuit which has been found desirable for such application is manufactured by Siemens AG under model designation TDA 4817. This type of integrated circuit, or "IC", is intended to be used with a power semiconductor switch, typically a MOSFET transistor, inductor, diode and output capacitor. Such IC's have a current envelope input useful in improving the power factor of electronic power supplies, including those for powering fluorescent lamps. However, such arrangements have been observed to exhibit distortion in the region of the zero-crossing of the AC line sine wave power source. This crossover distortion is particularly significant at low power levels. It has been found to be caused by the non-linearity in current transfer resulting from the effect of charging four inherent (or "parasitic") capacitances in such circuits. The four parasitic capacitances are the winding capacitance of the inductor, the output capacitance of the transistor, the junction capacitance of the diode, and the stray capacitance of the circuit. In an ideal circuit, turning off the transistor will result in a step increase in voltage across the transistor, allowing the diode to immediately begin conduction of current from the inductor to the load. However, in an actual circuit, the inductor current will charge the four parasitic capacitances giving a finite slope to the rising voltage across the transistor as it turns off. When the AC line voltage is near the zero crossing, the inductor current becomes small enough that the energy stored in the inductor is not sufficient to charge the four parasitic capacitances to the voltage required to cause the diode to conduct. The resonant circuit formed by these four parasitic capacitances and the inductor oscillates until the transistor is turned back on. Under this condition, no power is delivered to the output capacitor and the load, and hence, very little current is drawn from the AC line. When the load is large, the inductor current is large enough that the four parasitic capacitances are quickly charged and crossover distortion is less significant. However, with light loads, crossover distortion is more pronounced.

It has been found that, for a fixed load, adding a bias at the current envelope input to the power factor control integrated circuit will provide compensation to reduce crossover distortion, but with varying loads a fixed bias results in unacceptable performance except at the particular load for which the bias was designed since the compensation will not be correct as the load varies from the fixed design point.

SUMMARY OF THE INVENTION

The present invention overcomes this shortcoming by providing a compensation circuit which adjusts the bias inversely to input current. In one embodiment shown, a frequency-to-voltage converter circuit adjusts the bias in response to the load. In this embodiment, the compensation circuit is in the form of a charge pump delivering a pulse train for each OFF to ON transition of the power transistor which is integrated at the current envelope input of the power factor control IC to produce a bias signal for reducing crossover distortion. This compensation tracks load changes because the frequency of operation increases with a reduction in load, resulting in a desirable increase in the effective bias under those conditions as the increased pulses per unit time from the charge pump output are integrated. It is to be understood that the bias signal is to increase in response to a decrease in input current in the practice of the present invention. In another embodiment, the transistor switch load current is sensed and used to create a bias signal that decreases as the input current increases.

DETAILED DESCRIPTION

Figures 1, 3:
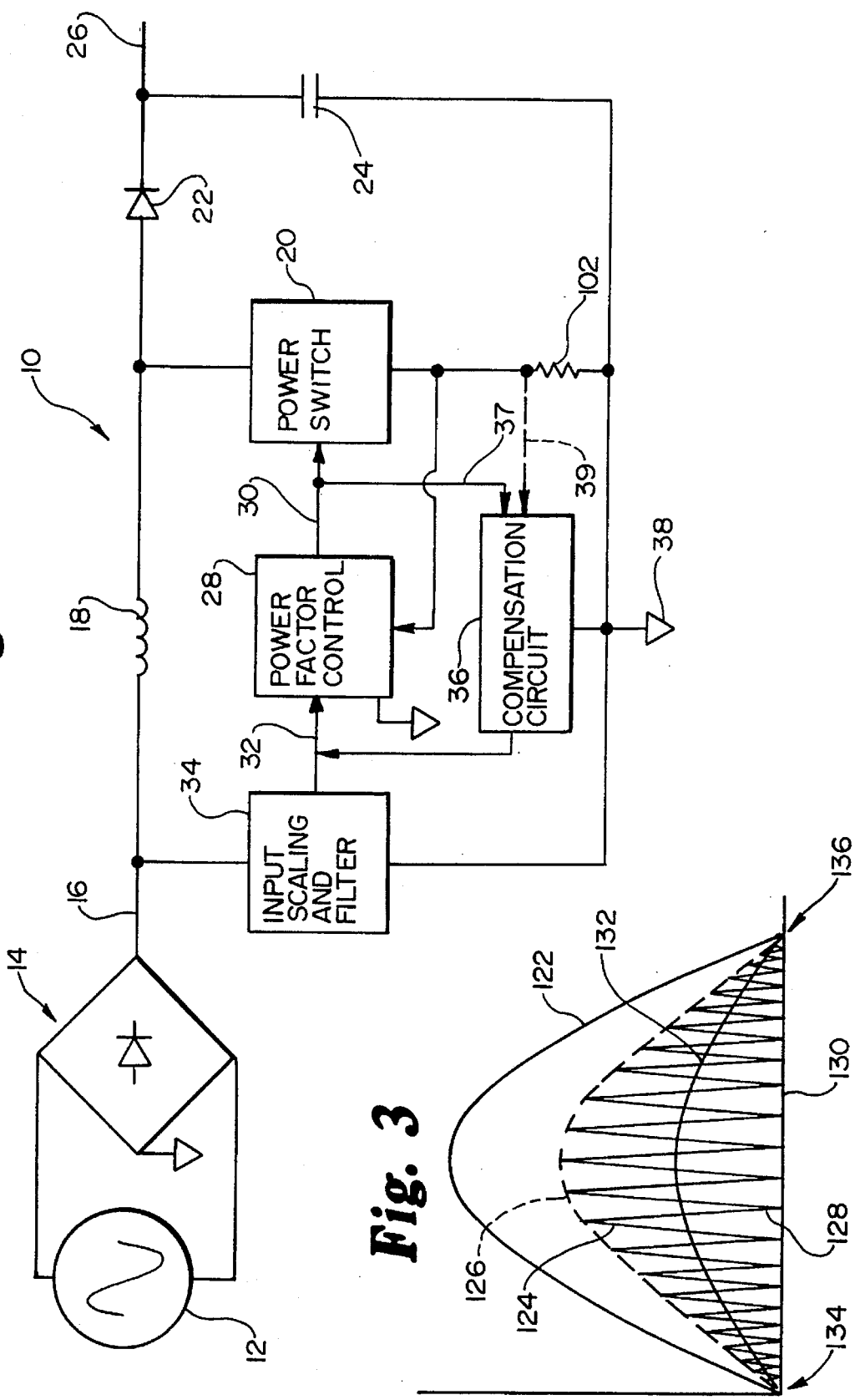
FIG. 1 is a combined block diagram and simplified schematic showing the compensation circuit of the present invention in a boost-type preregulator system.
FIG. 3 is a waveform illustrating the critical conduction mode of operation of the system of FIG. 1.

Referring to the Figures and most particularly to FIG. 1, a preregulator system 10 useful in the practice of the present invention may be seen. System 10 is preferably powered by a conventional 120 VAC, 60 Hz sine wave source 12 connected to a conventional full-wave bridge rectifier circuit 14. The output from bridge 14 on line 16 is coupled to a boost topology circuit made up of an inductor 18, a switch 20, a diode 22, and a capacitor 24. Line 26 is preferably connected to further circuitry as a load (not shown) which may include an electronic ballast for fluorescent lamps, or other circuitry which can benefit from a regulated DC output such as is provided by system 10. The circuitry described herein is intended to operate in the range of approximately 20 to 70 Watts input power.

Switch 20 is preferably driven by a power factor control circuit 28 via line 30. Control 28 preferably regulates the operation of switch 20 to provide a near-unity power factor at the input to system 10 by providing a sine wave current envelope reference signal on line 32 delivered by the input scaling and filter circuit 34. It is to be understood that the signal on line 32 is proportional to the instantaneous magnitude of the voltage of the sine wave power source 12 and calls for an envelope of inductor current proportional to the signal on line 32 so that the input current drawn from source 12 will be proportional to the voltage of power source 12 in order to achieve a near-unity input power factor. It is to be further understood that the various parts of system 10 may be referenced to a common potential, indicated by a "circuit common" symbol 38.

In a first embodiment, an input of a compensation circuit 36 is connected via line or connection 37 to the output 30 of the power factor control circuit 28. An output of compensation circuit 36 is connected to a current envelope input of control 28 via line 32. In this embodiment circuit 36 uses a frequency-to-voltage conversion technique to provide correction for crossover distortion during each zero-crossing of the sine wave power source 12 and to adjust such correction as needed in response to load changes. The frequency to voltage conversion in this embodiment is accomplished by a charge pump circuit. In an alternative embodiment (described in more detail below), connection 37 is not used; the compensation circuit of the alternative embodiment receives an input from line 39 (which is not used in the first embodiment) as a signal proportional to the current passing through power switch 20, as measured or transduced by resistor 102. In each embodiment connection 41 provides a current feedback signal for control 28.

Figure 2:
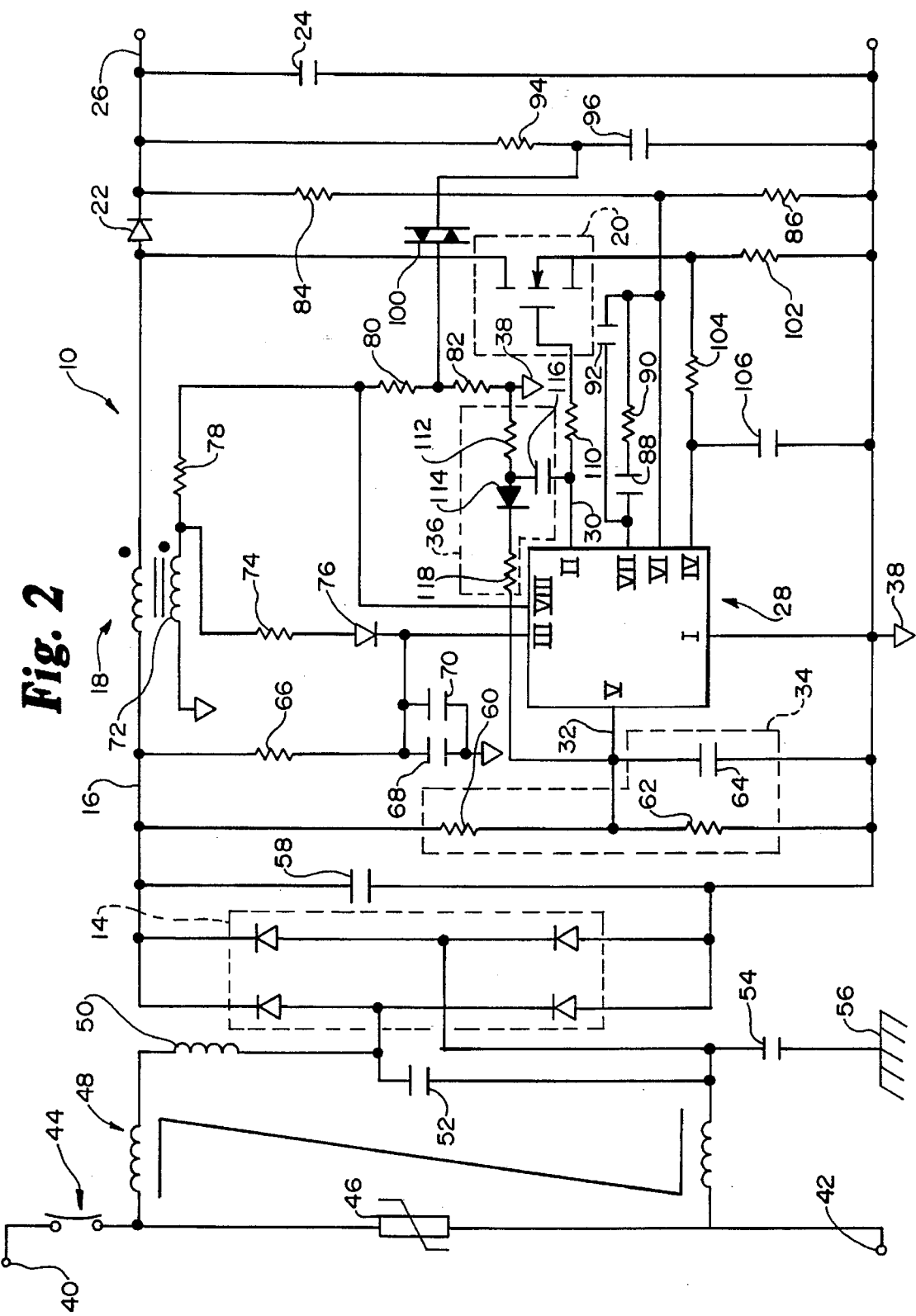
FIG. 2 is a detailed schematic of the system of FIG. 1.

Referring now most particularly to FIG. 2, a detailed schematic of the first embodiment of system 10 may be seen. Input terminals 40, 42 are preferably connected across the sine wave power source 12 (such as an AC line). A thermal circuit breaker 44 may be provided as a protective device for system 10. A conventional metal oxide varistor surge suppressor 46 may also be used to protect system 10. A pair of conventional smoothing inductors 48, 50 together with a pair of conventional capacitors 52, 54 provide input filtering for system 10, with capacitor 54 preferably connected to an earth ground 56. The full wave rectifier circuit 14, made up of four diodes connected in a full bridge configuration, provides full-wave rectified voltage between line 16 and circuit common 38. A 0.22 uF capacitor 58 provides additional input filtering. The input scaling and filter circuit 34 is preferably made up of a 2.2 MEG resistor 60, a 16.2 k resistor 62 and a 0.01 uF capacitor 64. The power factor control 28 is preferably a type TDA 4817 integrated circuit available from Siemens AG, as has been stated. Supporting circuitry includes a 120 k resistor 66, a 47 uF capacitor 68, a 0.1 uF capacitor 70, and an inductor 18 of 1.35 mH. Inductor 18 preferably has an auxiliary winding 72 supplying a 10 ohm resistor 74 and a type 1N4933 diode 76. A 22 k resistor 78, a 36 k resistor 80, and a 1 k resistor 82 are connected in series from winding 72 to circuit common 38. Diode 22 is preferably a type EGP20G available from General Instrument. A resistive network made up of a 1 MEG resistor 84 and a 7.5 k 1% resistor 86 is connected between output line 26 and circuit common 38. A resistive-capacitive network made up of a 0.33 uF capacitor 88, a 10 k resistor 90, and a 1.0 nF capacitor 92 is connected between pins VI and VII of IC 28. Output capacitor 24 is preferably an 82 uF, 350 volt capacitor. A 470 k resistor 94 and a 4.7 nF capacitor 96 are preferably connected across output lead 26 and circuit common 38 and their junction is connected to a conventional diac 100. Power switch 20 is preferably a type IRF-730 available from International Rectifier and is connected in series with a 0.33 ohm resistor 102 which has a resistive-capacitive network connected to it made up of a 330 ohm resistor 104 and a 1 nF capacitor 106 for filtering.

A 22 ohm resistor 110 is preferably connected in series with the gate of switch 20.

The compensation circuit 36 is preferably made up of a 3.9 k ohm resistor 112, a type 1N4148 diode 114, a 220 pF capacitor 116, and a 33 k ohm resistor 118.

Referring now more particularly also to FIGS. 3 in addition to FIGS. 1 and 2, the operation of system 10 is as follows. System 10 provides a regulated DC output voltage on line 26 by operating power switch 20 to correct for a voltage error in comparing a voltage reference (not shown) internal to IC 28 to an output voltage feedback signal provided by resistors 84,86 to pin VI of IC 28. While system 10 is providing the regulated DC output on line 26, it also modulates the input current to improve the input power factor according to the reference signal provided at pin V (the current envelope input) of IC 28.

FIG. 3 shows idealized waveforms including a half cycle of the voltage waveform from the AC sine wave power source 12 as waveform 122. Control circuit 28 operates in a critical conduction mode to modulate current in inductor 18 in a succession of triangular current modulation pulses by turning switch 20 ON causing current to ramp up, for example, along slope 124 and turning switch 20 OFF, permitting current in inductor 18 to ramp down, for example, along slope 128.

It is to be understood that the critical conduction mode is a control method where the current in inductor 18 is ramped from zero up to a peak value and then allowed to ramp back down to zero, with this cycle repeating immediately upon the inductor current reaching zero. The zero inductor current condition is determined by sensing the polarity of voltage across auxiliary winding 72 of inductor 18. Critical conduction can be thought of as a mode of operation between discontinuous and continuous current conduction modes of operation. In the critical conduction mode, the power factor control circuit 28 modulates the peak current of the triangular pulses in inductor 18 to follow the modulation envelope 126 that is proportional to the rectified AC line voltage 122. With the boost topology used, the average input current is equal to average inductor current 132. Since the average inductor current 132 is equal to one half of the peak of the triangular current pulse 124, on a pulse-by-pulse basis the average input current will be proportional to the modulation envelope 126 and also to the waveshape of the input voltage 122. It is to be understood that when another topology, such as buck-boost or flyback, is operated in the critical conduction mode, the average input current is not linearly proportional to the peak inductor current, so the improvement in input power factor is less, although for some applications it may be high enough. Nevertheless, the power factor of circuits using other topologies (other than boost) would also be improved by the use (and fall within the scope) of this invention.

When transistor 20 is ON, the current in resistor 102 will be indicative of the current in line 16 because diode 22 will then be reverse biased, blocking effects from the output capacitor 24 and load connected to lead 26. The current reference signal on lead 32 provides a sine wave reference waveform 126 which will cause control circuit 28 to turn transistor 20 OFF once ramp 124 reaches envelope 126. With switch 20 OFF the current in inductor 18 and lead 16 will ramp down along slope 128 until the inductor current reaches zero at baseline 130. This process will repeat itself with the peak of the successive triangular current pulses following a sine wave envelope 126 in phase with the input voltage waveform 122. The average current generated by this process will be one-half the height of the triangular current waveforms, as indicated by the average current waveform 132. It is to be understood that the network of capacitors 88 and 92, along with resistor 90 acts to slow the internal voltage error amplifier (not shown) down so that the magnitude of the current envelope 126 is permitted to change only slowly with respect to the AC line frequency, thus resulting in an apparent unchanged modulation envelope 126 of input current taken over only one half cycle of the input or AC line frequency. It is to be understood that inductors 48 and 50, along with capacitors 52 and 58 filter the triangular inductor current into a generally smooth and sinusoidal input current.

As will be apparent from an inspection of FIG. 3, as the average current decreases, the frequency of the modulation for the critical conduction mode will increase. It is to be understood that the slope of the triangular current pulse sides is determined by the available voltage, while the peak of the pulse is determined by how much current is needed to supply the load on line 26. Thus if the current demand doubled from that shown in FIG. 3, (and the input voltage remained the same) each "new" current pulse would ramp up at the same rate as that shown in FIG. 3, but the peak current would double from that shown in FIG. 3, and the base of each current pulse would widen, with the consequent reduction in operating frequency at the higher current. (The slope of the decreasing side of each current pulse may be different than that of the increasing side, since it is a function of the voltage across the inductor 18.)

Figure 4:
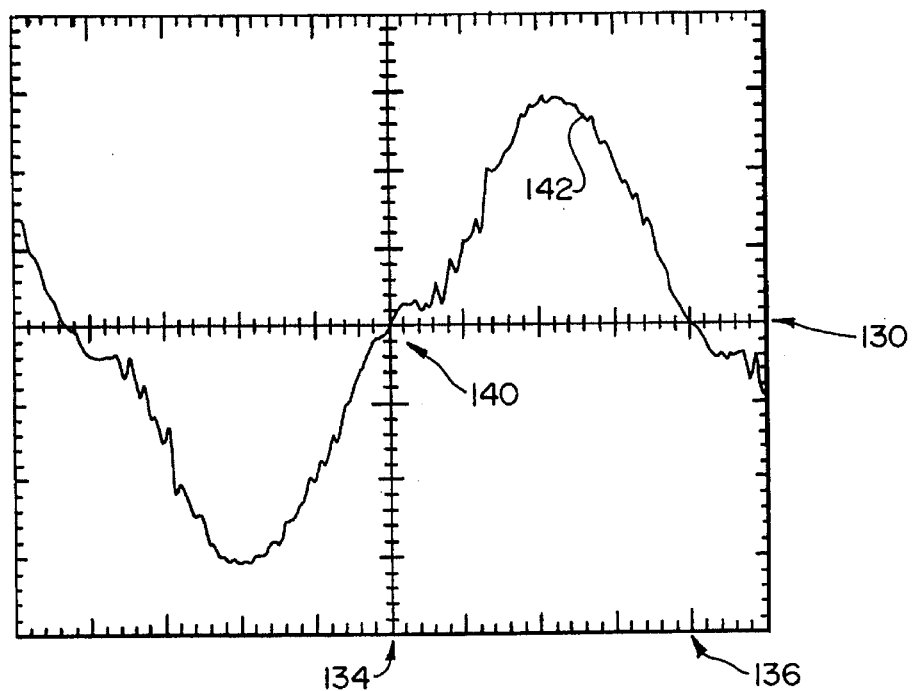
FIG. 4 is a waveform illustrating the crossover distortion associated with the zero-crossing of the sine wave power source for the system of FIG. 1 operating at a light load and with the compensation circuit disabled.

Referring now also to FIG. 4, at each zero crossing 134, 136 of the AC voltage waveform of source 12, a crossover distortion 140 in the input current 142 (i.e., the current into terminal 40) will occur because of the ringing of transistor 20, as has been previously mentioned. The waveform shown in FIG. 4 illustrates operation at light loading without the compensation circuit 36 effective in system 10. It has been found that using capacitor 116 to provide a predetermined current pulse or quantity of charge from the output line 30 of IC 28 through diode 114 will (when integrated by capacitor 64) compensate for the crossover distortion that would otherwise occur. Resistor 112 provides a discharge path for capacitor 116 between pulses. Resistor 118 serves to limit the current available to capacitor 116 and allows scaling of the current pulse or charge packet delivered to the current reference input line 32 of IC 28. Capacitor 64 in circuit 34 receives and time-average-integrates the succession of pulses from the charge pump circuit 36 into a load-dependent bias signal applied to the current envelope input, pin V, of control 28. In operation, capacitor 116 is charged when the signal on line 30 transitions from ON to OFF, and the charge on capacitor 116 is transferred to line 32 on the OFF to ON transition on line 30.

Figure 5:
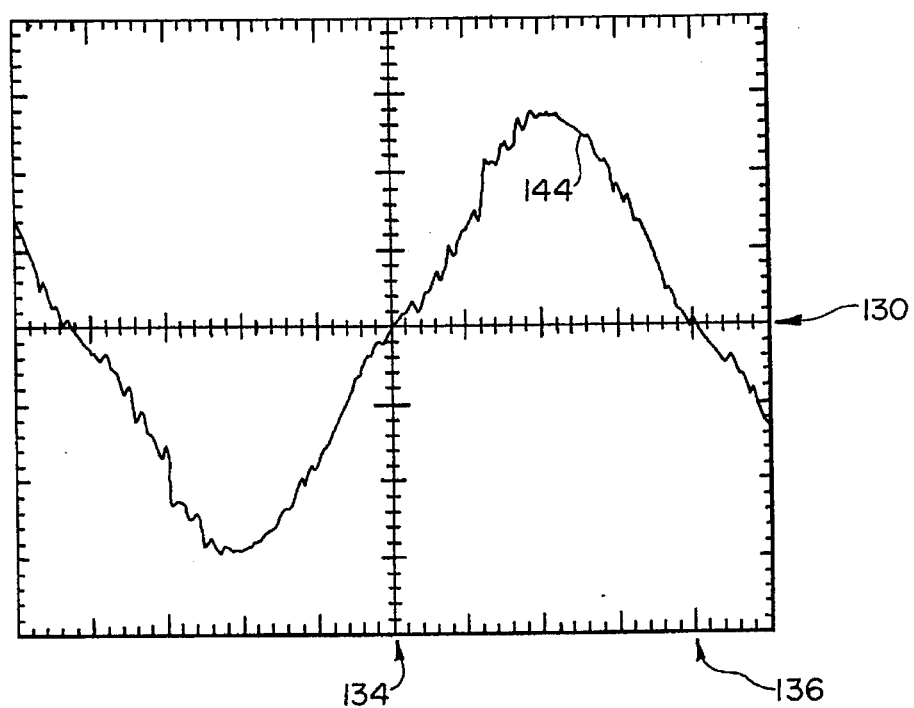
FIG. 5 is a waveform illustrating a light-load zero-crossing similar to that of FIG. 4, but with the compensation circuit operating.

An input current waveform 144 under the same light load and with the compensation circuit operating is shown in FIG. 5. It is to be understood that the waveforms of FIGS. 4–7 are oscillographs of actual input current waveforms. (The high frequency harmonics in FIGS. 4 & 5 are believed to be due to noise on the AC supply line causing current to flow into the EMI filter capacitors 52,54.)

As the load increases, the frequency of operation will decrease, causing less pulses (and hence charge) per unit time to be delivered by the charge pump when it is used as compensation circuit 36. Resistor 118 and capacitor 64 will provide a time integral operation on the output of circuit 36. With decreased frequency, the level of the integrated pulses will fall, providing less compensation or a decrease in bias on line 32 connected to the current envelope input pin V of IC 28, thus tracking changes in load with the compensation or bias needed to correct for crossover distortion.

Figure 6:
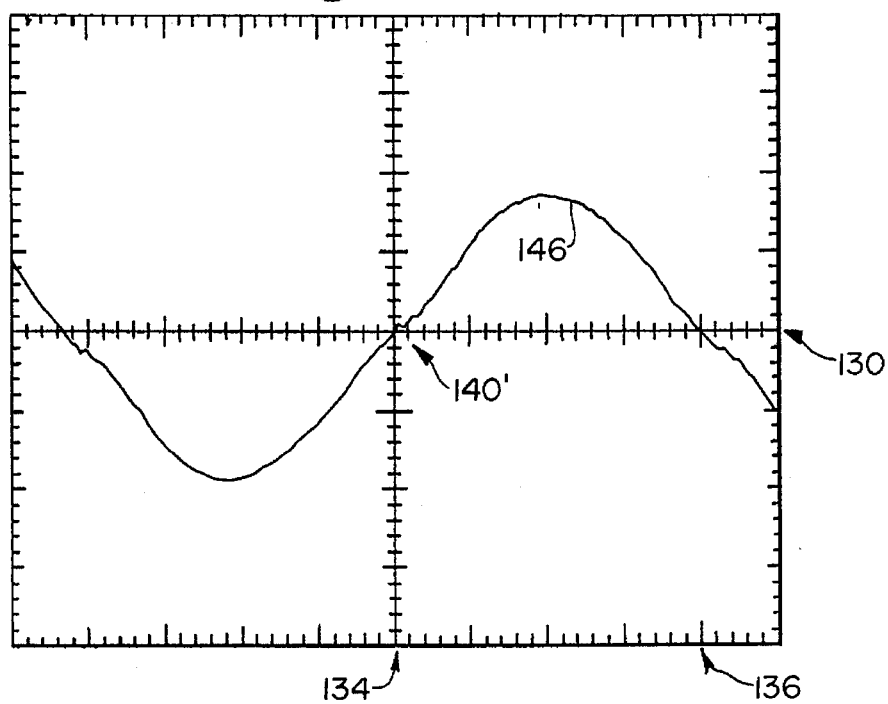
FIG. 6 is a waveform illustrating the crossover distortion associated with the zero-crossing of the sine wave power source for the system of FIG. 1 operating at a heavy load and with the compensation circuit disabled.
Figure 7:
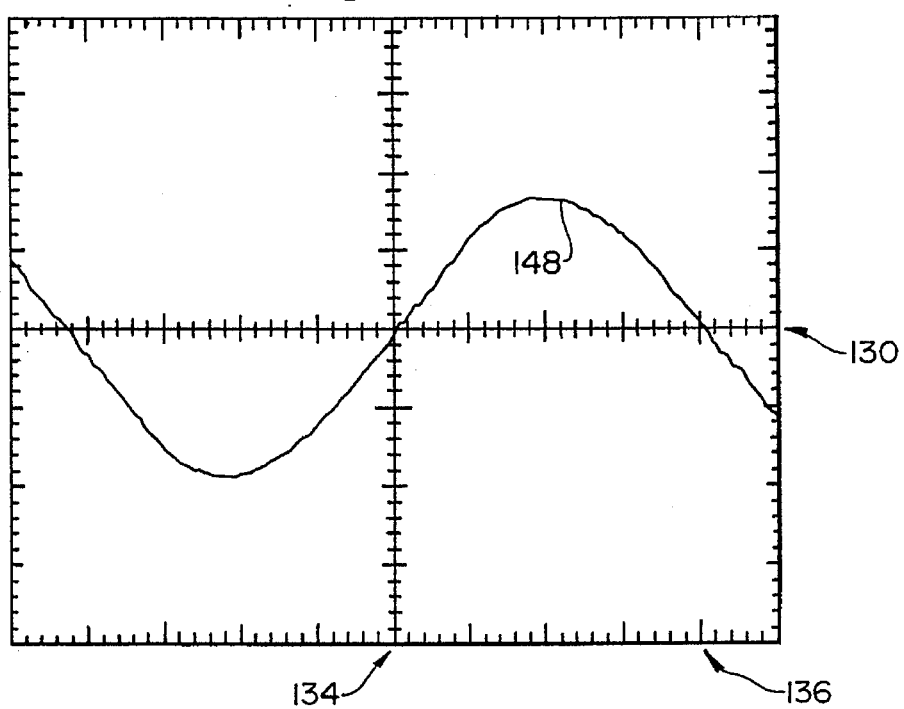
FIG. 7 is a waveform illustrating a heavy-load zero-crossing similar to that of FIG. 6, but with the compensation circuit operating.

FIG. 6 shows input current 146 under heavy load without the compensation circuit 36 operating and illustrates the crossover distortion 140' that exists under this operating condition. FIG. 7 shows the input current waveform 148 when system 10 is operating under the same heavy load and the compensation circuit 36 is effective to correct for crossover distortion.

Figure 8:
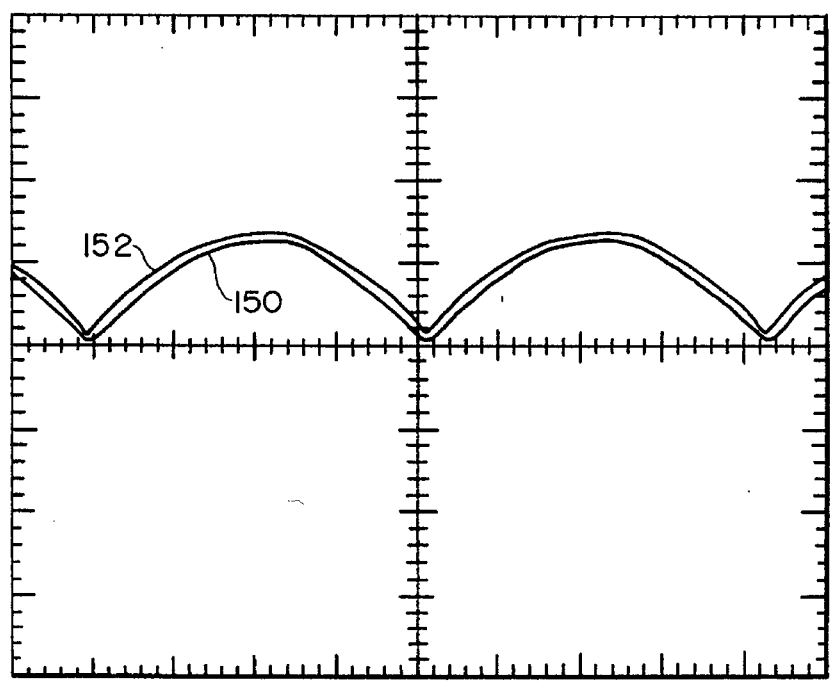
FIG. 8 is a pair of waveforms showing the current envelope reference signals for a heavy load with and without the compensation circuit operating.
Figure 9:
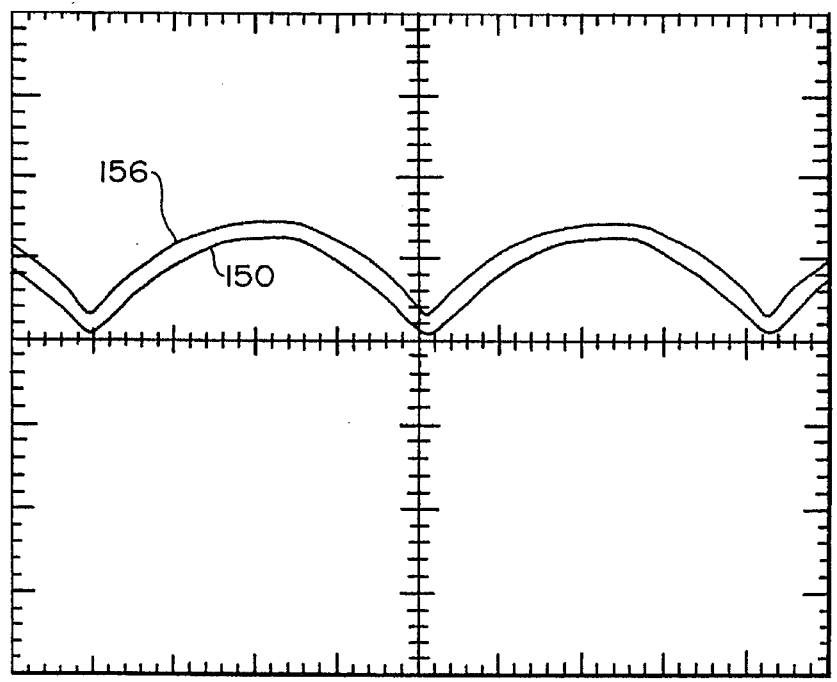
FIG. 9 is a pair of waveforms similar to those of FIG. 8, but for a light load.

Referring now also to FIGS. 8 and 9, various waveforms illustrating the compensation circuit bias signal effect on the current envelope reference signal delivered to pin V of IC 28. In FIG. 8, waveform 150 is the input current envelope reference signal at lead 32 (pin V of IC 28) at a heavy load without the compensation circuit active. Waveform 152 is the same, except with the compensation circuit active to provide a bias signal which can be observed to be the difference between waveforms 152 and 150. In FIG. 9, waveform 150 is still the uncompensated input current envelope reference (which is representative of the input voltage, via the resistive voltage divider 60,62) although this waveform was taken while the system was operating under a light load. Waveform 156 is the input current envelope reference signal on line 32, but with the compensation circuit active and operating at the same light load as that for waveform 150 in FIG. 9. It can be seen that with a light load, the bias signal is larger than that with a heavy load, again with the difference between waveforms 156 and 150 representative of the bias or compensation signal provided by the (integrated) charge pump circuit output.

Figure 10:
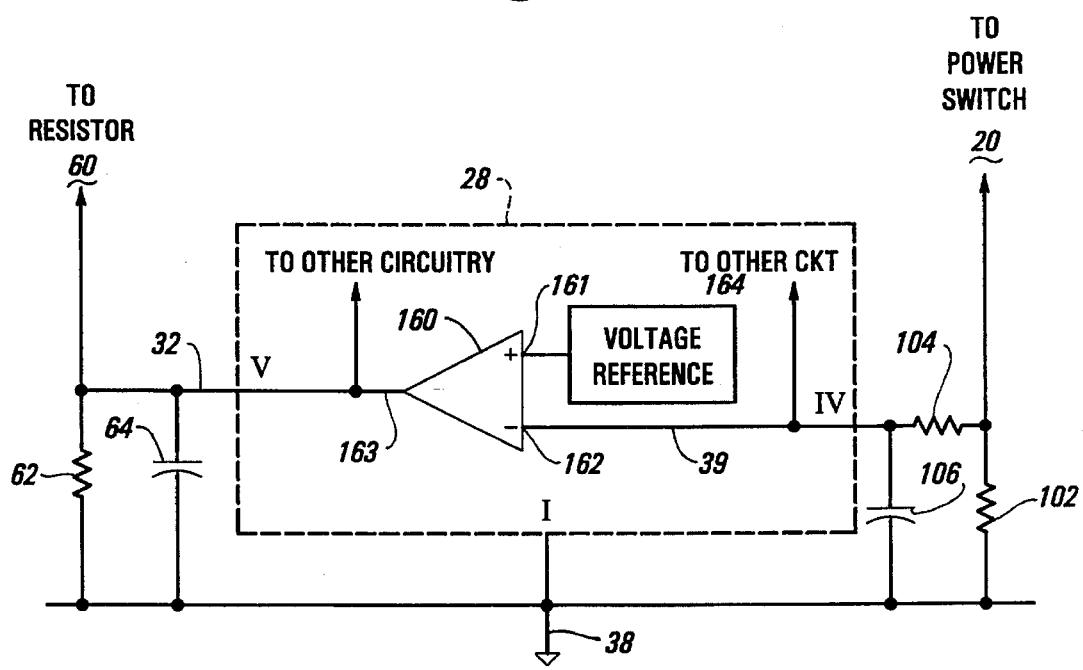
FIG. 10 is a partial schematic showing an alternative embodiment for the compensation circuit of the present invention.

An alternative embodiment of the compensation circuit 36 is shown in FIG. 10. This circuit can be made up of discrete parts and connected externally of IC 28 or it can be formed as an integrated circuit within a power factor controller similar to IC 28. In this embodiment, connection 37 of FIG. 1 and circuit 36 of FIG. 2 is not used. In its place a transconductance amplifier 160 is connected via line 39 to pin IV of IC 28 and via line 163 to pin V of IC 28 to produce an output current that is proportional to the voltage difference between a non-inverting input 161 and an inverting input 162 of amplifier 160. The non-inverting input 161 is connected to a voltage reference source 164. The output current from amplifier 160 on line 163 is integrated by capacitor 64 to add a bias voltage across resistor 62. The voltage at pin IV is proportional to the load current through transistor 20. When the average voltage at pin IV is equal to an output voltage on line 161 of the voltage reference source 164, then the average value of output current on line 163 will be zero, and no bias voltage will be produced by amplifier 160 on line 163. When the average voltage at pin IV is lower than the voltage on line 161, the average value of output current from amplifier 160 on line 163 will be positive, and it will produce a bias voltage that increases as the transistor current decreases. Since transistor current is representative of input current in line 16 (see FIG. 1), the bias signal on line 32 will be inversely related to input current, i.e., the bias signal will increase when input current decreases. The transconductance of amplifier 160 is preferably approximately 0.1 Ma/V, and the voltage reference source is preferably approximately 200 mV on line 161.

The invention is not to be taken as limited to all of the details thereof as modifications and variations thereof may be made without departing from the spirit or scope of the invention. It is to be understood to be within the scope of this invention to incorporate the compensation circuit within the power factor control IC itself as described above or to use other power factor controllers as alternatives to IC 28, provided that they have a current envelope input and control the input current by sensing the peak value of a signal representative of the inductor current. It is further to be understood to be within the scope of this invention to compensate for input voltage variations using the compensation system and circuit described above, since the input current will decrease when the input voltage increases, due to the output power being regulated to a relatively constant value. When the input current changes in response to changes in input voltage, the charge pump circuit will automatically compensate for such changes in the input voltage, based on the change in frequency accompanying the input current change.

What is claimed is:

1. In a preregulator system of the type operating from an alternating current power source and having a power factor control circuit for regulating an output voltage by modulating the peak value of triangular current pulses in an inductor according to an envelope proportional to the time varying magnitude of the voltage of the alternating current power source, the improvement in combination therewith comprising a compensation circuit having an output connected to an input of the power factor control circuit in the form of a bias signal varying inversely to a signal proportional to the amount of input current drawn from the alternating current power source such that crossover distortion in a zero-crossing of the current drawn from the alternating current power source is substantially reduced.

2. The preregulator system of claim 1 wherein the compensation circuit comprises a frequency-to-voltage conversion circuit.

3. The preregulator system of claim 1 wherein the compensation circuit comprises an amplifier.

4. The preregulator system of claim 1 wherein the compensation circuit comprises a transconductance amplifier having a voltage reference source connected to a non-inverting input thereof such that the transconductance amplifier provides the bias signal varying inversely to the signal proportional to the amount of input current drawn from the alternating current power source.

5. The preregulator system of claim 4 wherein the signal proportional to the amount of input current comprises a signal representative of the current pulses in the inductor.

6. In a preregulator system of the type operating from a sine wave power source and having a power factor control circuit using first and second output states for regulating an output voltage by controlling current in a series connected inductor in a critical conduction mode by providing a triangular modulation of current in the inductor according to a sine-wave modulation envelope, and wherein the power factor control circuit is of the type whose frequency of operation varies in response to the amount of current delivered by the preregulator to a load thereon, the improvement in combination therewith comprising a compensation circuit connected between an output and an input of the power factor control circuit and providing a frequency-dependent compensation signal to the input of the power factor control circuit varying in response to the operating frequency of the power factor control circuit such that crossover distortion in the inductor current associated with a zero-crossing of the sine wave power source is substantially reduced in the face of varying loads on the preregulator system.

7. The improved preregulator system of claim 6 wherein the compensation circuit comprises a frequency-to-voltage conversion circuit.

8. The improved preregulator system of claim 6 wherein the compensation circuit further comprises a charge pump circuit providing a pulse train output.

9. The improved preregulator system of claim 6 further comprising means for integrating the pulse train output of the charge pump circuit.

10. The improved preregulator system of claim 6 wherein the input to the power factor control circuit comprises a current envelope input.

11. In a preregulator system operating from a sine wave power source, the preregulator system of the type having a power factor control circuit having first and second output states for regulating an output voltage in a critical conduction mode by providing a triangular modulation of current in an inductor according to a sine-wave modulation envelope, the improvement in combination therewith comprising a) a compensation circuit connected between an output and an input of the power factor control circuit and providing a current pulse to the input each time the power factor control circuit transitions from the first to the second output state; and b) means for integrating the current pulses from the compensation circuit to provide a time-averaged integral of the current pulses at the input of the power factor correction circuit such that crossover distortion in a zero-crossing of the current in the inductor associated with a corresponding zero-crossing of the sine wave power source is substantially reduced in the face of varying loads on the preregulator system.

12. The apparatus of claim 11 wherein the input of the power factor control circuit comprises a current envelope reference input.

13. The apparatus of claim 11 wherein the means for integrating the current pulses comprises a capacitor.

14. The apparatus of claim 11 wherein the compensation circuit comprises a charge pump circuit connected between the output and the input of the power factor control circuit.

15. The apparatus of claim 14 wherein the charge pump circuit further comprises a series-connected capacitance for blocking DC coupling through the charge pump circuit.

16. The apparatus of claim 15 wherein the charge pump circuit still further comprises means for blocking current pulses from coupling through the charge pump circuit when the power factor control circuit transitions from the second to the first output state.

17. The apparatus of claim 16 wherein the means for blocking current pulses comprises a diode connected in series with the series connected capacitance.

18. The apparatus of claim 16 wherein the charge pump circuit still further comprises a first resistance connected in series with the diode for scaling the current pulse.

19. The apparatus of claim 18 wherein the charge pump circuit further comprises a second resistance connected from a junction between the diode and the capacitance to a circuit common potential for discharging the capacitance between output state transitions.

20. A method of reducing distortion in each zero-crossing of a sine wave input current of a preregulator of the type having a power factor control circuit having a frequency of operation varying inversely with a magnitude of current drawn from the preregulator, the power factor control circuit having first and second output states for regulating an output voltage by providing triangular modulation of current according to a sine-wave envelope, the method of reducing distortion comprising the steps of:

a) coupling a pulse of a predetermined magnitude from an output to an input of the power factor control circuit each time the power factor control circuit transitions from the first to the second output state; and b) time-average-integrating the pulses at the input to the power factor control circuit to provide a bias signal at the input having a magnitude proportional to the operating frequency of the power factor control circuit.

21. The method of claim 20 further comprising the additional step of:

c) blocking transmission of pulses from the output to the input of the power factor control circuit each time the power factor control circuit transitions from the second to the first output state.

22. The method of claim 20 wherein step a) further comprises blocking the transmission of DC in the coupling of the pulses.

23. An improved boost-type preregulator for operation from a sine wave power source, the preregulator comprising:

a) a rectifier circuit for converting a sine wave power source into a rectified DC power source with respect to a circuit common;

b) an inductor connected in series with the rectifier circuit;

c) a diode having an anode and a cathode, with the anode connected to the inductor;

d) a transistor having two power terminals and a control terminal, with one power terminal connected in between the inductor and the anode of the diode;

e) a capacitor connected between the cathode of the diode and the circuit common such that the inductor, diode, transistor, and capacitor together form a boost-type preregulator circuit;

f) a power factor control means having:

i) an input for receiving a current-envelope command signal connected to a signal representative of a voltage of the sine wave power source, and ii) an output connected to the control terminal of the transistor and having first and second output states for switching the transistor between a first output condition and a second output condition at a frequency substantially greater than a fundamental frequency of the sine wave power source, such that the power factor control means controls the transistor to provide a regulated output voltage across the capacitor by drawing current from the sine wave power source having an envelope substantially in phase with the voltage of the sine wave power source; and g) a charge pump circuit connected between the output and the input of the power factor control means and having means for coupling a current pulse of a predetermined magnitude from the output to the input of the power factor control means at each transition from the first to the second output state of the power factor control means such that crossover distortion in each zero-crossing of current drawn from the sine wave power source is substantially reduced.

24. The improved preregulator of claim 23 wherein the means for coupling a current pulse comprises a diode.

25. The improved preregulator of claim 23 wherein the charge pump circuit further comprises means for storing a charge for the current pulse at each transition from the second to the first output state of the power factor control means.

26. The improved preregulator of claim 25 wherein the means for storing a charge comprises a capacitor connected to the output of the power factor control means.

27. In a preregulator system of the type operating from an alternating current power source and having a power factor control circuit using first and second output states for regulating an output voltage by modulating the peak value of triangular current pulses in an inductor operating in a critical conduction mode according to an envelope proportional to the instantaneous magnitude of the voltage of the alternating current power source, and wherein the power factor control circuit is of the type whose frequency of operation varies in response to the amount of input current drawn from the alternating current power source, the improvement in combination therewith comprising a compensation circuit connected between an output and an input of the power factor control circuit in the form of a bias signal varying directly with the operating frequency of the power factor control circuit such that crossover distortion in a zero-crossing of the current drawn from the alternating current power source is substantially reduced.

* * * * *